C. J. AXTELL.
ELECTRICAL SYSTEM OF POWER TRANSMISSION AND REGENERATIVE BRAKING.
APPLICATION FILED FEB. 4, 1918.
1,298,433. Patented Mar. 25, 1919.
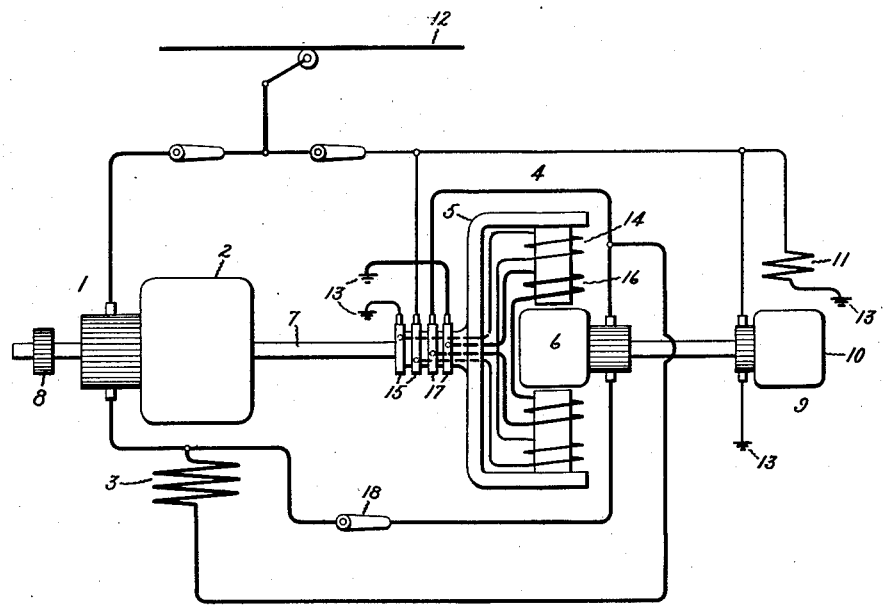
Inventor:
Clinton J. Axtell,
by Albert G. Davis
His Attorney.

UNITED STATES PATENT OFFICE.

CLINTON J. AXTELL, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION AND REGENERATIVE BRAKING.

1,298,433.

Specification of Letters Patent.

Patented Mar. 25, 1919.

Application filed February 4, 1918. Serial No. 215,279.

*To all whom it may concern:*

Be it known that I, CLINTON J. AXTELL, a citizen of the United States, residing at Schenectady, county of Schenectady, State of New York, have invented certain new and useful Improvements in Electrical Systems of Power Transmission and Regenerative Braking, of which the following is a specification.

My invention relates to electrical systems of power transmission and regenerative braking, and particularly to electrical systems of power transmission and regenerative braking comprising a main dynamo-electric machine which is required to operate either as a motor to drive, or as a generator to brake, a load, such as a traction or similar load.

My invention has for its principal object the provision in systems of the kind referred to of means whereby, during the generator operation of the main dynamo-electric machine, the effect of variations in the speed of said machine upon the braking torque produced thereby may be compensated to the desired degree.

My invention, furthermore, has for an object the provision of means whereby the main dynamo-electric machine will be caused to operate, during its motor operation, with a series speed torque characteristic.

Other objects of my invention will appear as this specification progresses.

In accordance with my invention I provide means, comprising a generator having rotatable field and armature members, for varying the excitation of the main dynamo-electric machine inversely with variations in its speed, one of said members being connected to rotate at speeds varying with the speed of said dynamo-electric machine and means being provided for rotating the other of said members.

For a better understanding of my invention, reference should be made to the accompanying drawing, the single figure of which illustrates diagrammatically a system embodying one form of my invention. Referring to the drawing, 1 represents a dynamo-electric machine having an armature 2 and a series field winding 3. 4 represents a generator having a rotatable field member 5, and a rotatable armature member 6. For the purpose of clearly indicating that the speed of the field member 5 varies with the speed of the armature 2, the field member 5 is illustrated as mechanically connected to the armature 2 by means of the shaft 7 which may also be connected to the axle of a vehicle, or other load, by means of the gear 8 and other mechanism (not shown). The armature member 6 of the generator 4 is connected to be driven by the motor 9, comprising the armature 10 and a shunt field winding 11 which are connected in multiple between the conductor 12 and ground 13. The conductor 12 and ground 13 constitute a variable voltage supply circuit. The field member 5 is provided with a main field winding 14, which is connected by means of the collector rings 15 between the conductor 12 and ground 13, and with an auxiliary field winding 16, which is connected by means of collector rings 17 between the field winding 3 of the dynamo-electric machine 1 and ground 13. The armature 6 of the generator 4 may be connected across the field winding 3 by means of the switch 18.

The operation of my invention, as at present understood, is as follows:

If it be desired to operate the dynamo-electric machine 1 as an ordinary series motor, this may be accomplished by connecting the same to the conductor 12 and maintaining the switch 18 open. The current for driving the dynamo-electric machine 1 will then pass from the conductor 12 through the armature 2, the series field winding 3, the left-hand collector ring 17 of the generator 4, the auxiliary field winding 16, and the right-hand collector ring 17 to ground 13.

If, however, it be desired to operate the dynamo-electric machine 1 as a motor with its series field winding 3 super-excited, the switch 18 will be closed. Assume the dynamo-electric machine 1 to be operating at a certain relatively low speed as a motor and to be rotating the field member 5 of the generator 4, and assume the motor 9 to be rotating the armature member 6 of the generator 4 in the same direction that the field member 5 is rotated by the dynamo-electric machine 1. A relatively heavy current will, therefore, traverse the armature 2 and the series field winding 3. The series field winding 3 will also be super-excited by a relatively heavy current supplied thereto by the generator 4, since the difference between the rate of rotation of the field member 5 of the generator 4 and the armature member 6 is relatively great, it being assumed that the motor 9 rotates the armature member 6 at approximately uniform speed. The current which traverses the armature 2 of the motor also traverses the auxiliary field winding 16 of the generator 4 and, since the auxiliary field winding 16 acts cumulatively with respect to the main field winding 14 during the motor operation of the dynamo-electric machine 1, the compounding effect thereof is greatest at low speeds of the dynamo-electric machine 1. If for any reason the speed of the dynamo-electric machine 1 increases the current, which traverses the armature 2, the series field winding 3, and the auxiliary field winding 16 of the generator 4, will decrease. Furthermore, the difference between the rate of rotation of the armature member 6 and the field member 5 will be decreased so that the super-exciting current supplied to the field winding 3 by the generator 4 will be decreased. It will thus be evident that, during the motor operation of the dynamo-electric machine 1, both the current in the field winding 3 which traverses the armature 2 and the current in the field winding 3 which is supplied thereto by the generator 4 vary inversely with the speed of the dynamo-electric machine 1 and that the dynamo-electric machine 1 will operate with a torque speed characteristic similar to that of a series motor. An increase of current through the armature 2 will act directly upon the field winding 3 and indirectly through the generator 4 to increase the field excitation of the dynamo-electric machine 1 thereby preventing objectionable rushes of current. Now assume the dynamo-electric machine 1 to be operating as a generator at a certain relatively high speed and to be returning power to the supply circuit, the series field winding 3 will then be excited solely by current supplied to it from the generator 4. The regenerated current will flow from ground 13 through the right-hand collector ring 17, the auxiliary field winding 16 of the generator 4, the left-hand collector ring 17, the armature 6 of the generator 4, the switch 18, the armature 2 of the dynamo-electric machine 1 to the conductor 12. The exciting current for the field winding 3 will flow from the armature 6 of the generator 4 through the switch 18 and the field winding 3 back to the armature 6. Since at the relatively high speed at which the armature 2 has been assumed to be rotating, the difference between the rates of rotation of the armature member 6 and the field member 5 is relatively low, the current supplied to the field winding 3 will be relatively low. If now the speed of the dynamo-electric machine 1 decreases, thereby increasing the difference between the rates of rotation of the armature member 6 and the field member 5, the current supplied by the generator 4 to the field member 3 will be increased thereby compensating to the desired degree for the effect of the reduction in speed upon the voltage developed in the armature 2, upon the current returned to the supply circuit, and upon the braking torque produced by the dynamo-electric machine 1. It is thus evident that, during the generator operation of the dynamo-electric machine 1, the current in the field winding 3 will vary inversely with the speed of the dynamo-electric machine and that the minimum speed at which the dynamo-electric machine will return power to the supply circuit is materially lowered. Since, during the generator operation of the dynamo-electric machine 1, the auxiliary field winding 16 of the generator 4 acts differentially with respect to the main field winding 14, if the voltage of the supply circuit suddenly decrease, the auxiliary field winding 16 will respond to increase in current to decrease the field strength of the generator 4 and reduce the current traversing the field winding 3 thereby preventing objectionable rushes of current.

While my invention is illustrated as embodied in a system comprising a series main dynamo-electric machine, it is manifestly feasible to employ a dynamo-electric machine having a series field winding and an independent field winding connected to be energized from the generator 4.

I conceive that various modifications of my invention may be made and I accordingly do not desire to be limited to the exact arrangement shown, but seek to cover in the appended claims all such modifications and arrangements which fall within the scope and spirit of my invention.

What I claim as new and desire to secure by Letters Patent of the United States, is,—

1. The combination with a dynamo-electric machine, of means comprising a generator having rotatable field and armature members for varying the excitation of said machine inversely with variations in its speed, one of said members being connected to rotate at speeds varying with the speed of said dynamo-electric machine, and means for rotating the other of said members.

2. The combination with a dynamo-electric machine provided with a field winding, of means for varying the excitation of said field winding inversely with variations in the speed of said machine, said means comprising a generator having a rotatable armature member, electrically connected to said field winding, and a field member, one of said members being connected to rotate at speeds varying with the speed of said machine, and means for rotating the other of said members.

3. The combination with a dynamo-electric machine provided with a field winding, of means for varying the excitation of said field winding inversely with variations in the speed of said machine, said means comprising a generator having a rotatable armature member, electrically connected to said field winding, and a field member provided with a winding in series with the armature of said machine, one of said members being connected to rotate at speeds varying with the speed of said machine, and means for rotating the other of said members.

4. The combination with a load, of a dynamo-electric machine adapted to operate as a motor to drive said load or as a generator to brake said load, means for varying the excitation of said dynamo-electric machine inversely with its speed, said means comprising a generator having a rotatable armature member, connected to excite said dynamo-electric machine, and a rotatable field member having a main field winding and an auxiliary field winding, said auxiliary field winding being connected in series with the armature of said dynamo-electric machine and arranged to act cumulatively with respect to said main field winding during the motor operation of said dynamo-electric machine and to act differentially with respect to said main field winding during the generator operation of said dynamo-electric machine, one of said members being connected to rotate at speeds varying with the speed of said dynamo-electric machine, and means for rotating the other of said members.

5. The combination with a load, of a series dynamo-electric machine adapted to operate as a motor to drive said load or as a generator to brake said load, a generator comprising a rotatable armature member, connected to supply current to the field winding of said dynamo-electric machine, and a field member, having a main field winding and an auxiliary field winding, said auxiliary field winding being connected in series with the armature of said dynamo-electric machine and arranged to act cumulatively with respect to said main field winding during the motor operation of said dynamo-electric machine and to act differentially with respect to said main field winding during the generator operation of said dynamo-electric machine, said dynamo-electric machine being connected to rotate one of said members, and means for rotating the other of said members in the same direction and at a greater speed.

In witness whereof, I have hereunto set my hand this 31st day of January, 1918.

CLINTON J. AXTELL.